April 15, 1952 C. G. SERIGHT ET AL 2,593,349

BEAT FREQUENCY OSCILLATOR FOR RECEIVERS

Filed Nov. 1, 1947

INVENTORS
CARL G. SERIGHT
HARRY F. BAKER
BY Harry Loniecke
ATTORNEY

Patented Apr. 15, 1952 2,593,349

UNITED STATES PATENT OFFICE 2,593,349

BEAT FREQUENCY OSCILLATOR FOR RECEIVERS

Carl G. Seright, Riverton, and Harry F. Baker, Moorestown, N. J., assignors to Radio Corporation of America, a corporation of Delaware Application November 1, 1947, Serial No. 783,518

2 Claims. (Cl. 250—20)

In this application, we disclose a new circuit for supplying beat frequency oscillations in a receiver for C. W. receiving or for direction finding purposes. The purpose of our invention is to provide such a circuit requiring no tubes in addition to the regular receiver tubes. By attaining this purpose, the receiver circuit effectiveness is increased at minimum expense.

Figure 1:
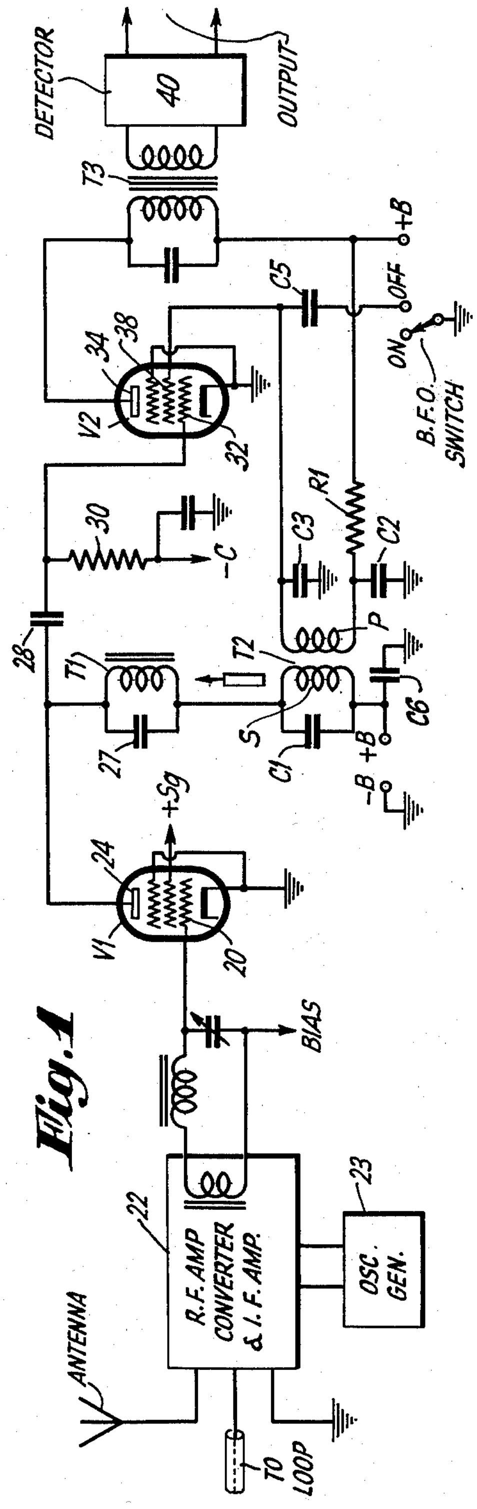
Figures 1A, 1B:
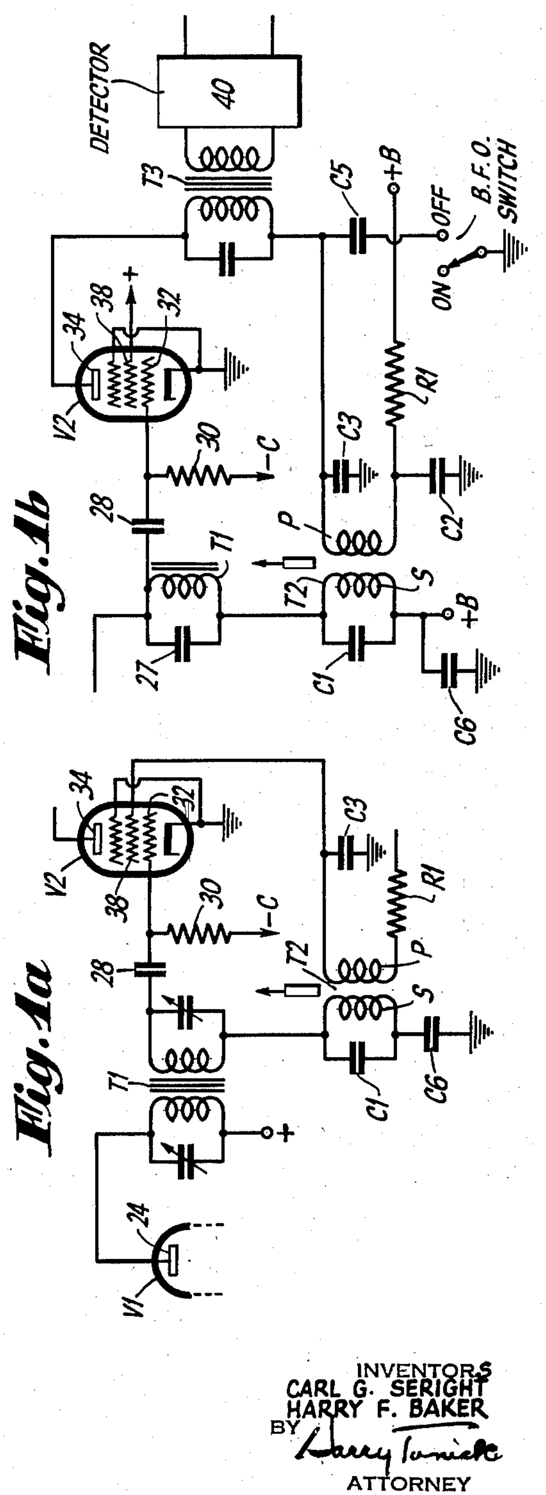

In describing the details of our invention, reference will be made to the attached drawings, wherein Fig. 1 illustrates by circuit element and circuit element connections, the essential features of a receiver and beat frequency oscillator arranged in accordance with our invention, and Figs. 1*a* and 1*b* illustrate modifications of Fig. 1.

In the drawings, V1 is an intermediate frequency amplifier or converter stage, the control grid 20 of which is excited by alternating currents representing signals such as, for example, currents of intermediate frequency derived at the output of the radio frequency amplifier converter and intermediate frequency amplifier 22, to which oscillation generator 23 is coupled. The signal currents amplified in 20 are repeated on the anode 24 and are supplied through coupling condenser 28 over biasing resistor 30 to the control grid 32 of a tube V2. The reactor T1 is tuned to parallel resonance, by capacitor 27, at the frequency of the signal appearing on the anode 24. V2 is a tube wherein the beat frequency oscillations are developed when the receiver is to be used in the reception of code or similar signals. The anode 34 is connected to the primary winding of a transformer T3 the secondary winding of which supplies output to be used as desired, here to a detector 40.

The beat frequency oscillator of our invention will now be described. The screen grid electrode 38 of tube V2 is connected to the primary winding P of a transformer T2, the secondary winding S of which is in series with the inductor T1 in the anode 24 circuit of tube V1. The screen grid 38 circuit is connected to a positive terminal on a D. C. potential source through resistor R1. C2 and C3 act as bypass condensers for currents of intermediate frequency. The condenser C1 also tunes the secondary winding S to the frequency of the beat frequency oscillations to be generated. This frequency is about a submultiple or a subharmonic of the frequency of the signal being amplified in the tubes V1 and V2. C6 also serves as a high frequency bypass for the positive potential source connected with the anode 24 of tube V1. The condenser C5 short circuits the oscillator including the primary winding of T2 when this condenser is connected to ground by a switch BFO. In the BFO "off" position, this switch places condenser C5 in shunt to winding P to short circuit the same with respect to alternating currents of the frequency which can be generated by this beat frequency oscillator. Of course, the BFO circuit could also be turned off by merely short circuiting either winding of T2 by means of switch BFO, and the method shown merely represents a convenient variation.

In operation, the signals supplied to the control grid 20 are amplified in tube V1, resonated in reactor T1 and impressed on the grid 32 of tube V2 to be amplified therein and fed by transformer T3 to the output. When the signals are incompletely modulated or unmodulated continuous waves, in order to make the same more readable, the BFO switch so labeled on the drawings is thrown to the open or "on" position, and oscillations are developed in the oscillator comprising the screen grid 38, transformer T2 and the control grid 32 of tube V2. This circuit is tuned by suitable adjustment of inductance and capacitance values to a sub-multiple of the frequency being amplified in tubes V1 and V2. Where this is an intermediate frequency, the transformer T2 is tuned to a frequency which is about a sub-multiple thereof. As is well known, a vacuum tube oscillator operates in such a manner that voltages harmonically related to the fundamental frequency voltage appear on the tube elements. It is also well known that such voltages are very much lower in amplitude than the fundamental frequency voltage. If the amplifier tube were caused to oscillate at a frequency nearly equal to the I. F. frequency, the amplitude of the BFO voltage would be so great as to block the amplifier operation at the I. F. frequency. By making the amplifier tube oscillate at approximately a sub-multiple of the I. F. frequency, however, BFO voltage of a proper amplitude is generated within the tube at a frequency audibly spaced from the I. F. voltage present in the tube, and the ability of the tube to amplify the I. F. signal is only moderately reduced by its simultaneous operation as an oscillator at the lower (sub-harmonic) frequency. For example, T2 may be tuned to a frequency equal to ⅓ of the intermediate frequency plus or minus ⅓ of the beat note resulting from beating the third harmonic of the beat frequency oscillations with the intermediate frequency oscillations being amplified. Voltages of a third harmonic of this sub-multiple frequency appear on the elements of tube V2 and beat with the intermediate frequency signal being amplified in tubes V1 and V2 to supply in the detector 40 output an audible note which is interpreted to represent the signal. The tube V2 acts as an I. F. amplifier when keyed tone or voice modulated signal is being received, and additionally as a generator of beat frequency voltage when continuous wave is being received or when it is desired to more completely modulate a signal, for example, in direction finding with a loop antenna on radio range or broadcast stations.

The grid circuit of the I. F. stage V2 is shown untuned. The tuning in the coupling between the stages V1 and V2 is in the anode circuit of V1 at T1. The tuned circuit of our beat frequency oscillator is in the plate circuit of the tube V1. However, a conventional double tuned I. F. transformer could as well be used in place of T1, with the secondary of T2 in series with the secondary of T1. The arrangement would then be as illustrated in Fig. 1*a* of the drawings. At the I. F. frequency, the stage V2 functions as an I. F. amplifier, with T1 the input circuit and T3 the output circuit. The circuits T2, etc. oscillate at a sub-multiple of the I. F. and a harmonic of these oscillations beats with the I. F. thus providing the beat frequency action. By operating the oscillator close to a sub-multiple of the I. F. to obtain an injection voltage at the I. F. frequency nearly equal in amplitude to the I. F. input signal voltage good operation is obtained. While our circuit shows the BFO oscillator circuit to consist of the screen grid, (38) cathode, and control grid (32) elements of V2, operation can also be obtained by using the plate element (34) as the feedback source, as for instance by connecting the primary P of T2 in series with the primary of T3 instead of the location shown in Figs. 1 and 1*a*. Then the arrangement is as illustrated in Fig. 1*b*.

The amplifier 22 and the local oscillator 23 connected thereto may be conventional and may be supplied by signals from an antenna or from a loop and may include radio frequency stages, the first converter, I. F. amplifier and so forth of a conventional receiver.

We claim:

1. In a wave frequency converted, a first electron discharge device having input electrodes including a cathode and having additional electrodes maintained electropositive relative to said cathode, an input circuit coupled to said input electrodes and comprising reactive elements resonant at a fundamental frequency and in series therewith, in said input circuit, other reactive elements resonant substantially at a submultiple of said fundamental frequency, an output circuit including reactive elements coupled to said cathode and to an electropositive electrode of said first device, connections for applying oscillatory energy of said fundamental frequency to said input circuit, said connections including the output electrodes of a second electron discharge device which output electrodes are connected in series with said first-named and second-named series reactive elements, and a feedback circuit coupling another electropositive electrode of said first device to said other resonant reactive elements of said input circuit.

2. In a signalling system, two tube stages in cascade, the first stage having at least input and anode electrodes, the second stage having at least output, control grid and screen grid electrodes, connections for impressing alternating signals to be amplified on the input of said first stage, means for deriving signals from the output of said second stage, a coupling between said control grid and said anode, reactive elements in said coupling parallel resonant at the frequency of said signals, and means for developing oscillations of a frequency which is substantially a subharmonic of the frequency of the signals being amplified comprising a transformer having its primary winding coupled to said screen grid and having its secondary winding effectively in series with said elements in the anode circuit of said first tube, and means for tuning said secondary winding to substantially a subharmonic of the frequency of the signals being amplified.

CARL G. SERIGHT.
HARRY F. BAKER.

REFERENCES CITED

The following references are of record in the file of this patent:

UNITED STATES PATENTS

| Number | Name | Date |
|---|---|---|
| 1,686,005 | Houck | Oct. 2, 1928 |
| 1,688,820 | Logwood | Oct. 23, 1928 |
| 2,022,085 | Johnson | Nov. 26, 1935 |
| 2,053,414 | Barden | Sept. 8, 1936 |
| 2,064,958 | Taylor | Dec. 22, 1936 |
| 2,122,283 | Harris | June 28, 1938 |
| 2,314,785 | Holland | Mar. 23, 1943 |
| 2,407,460 | Van Ryn | Sept. 10, 1946 |
| 2,488,584 | Covington | Nov. 22, 1949 |
| 2,503,780 | Van Der Ziel | Apr. 11, 1950 |
| 2,508,048 | Sziklai | May 16, 1950 |